July 28, 1959  H. J. HAMMERLY  2,897,410
PLUG-IN TYPE CIRCUIT BREAKER PANELBOARD
Filed March 7, 1955  2 Sheets-Sheet 2

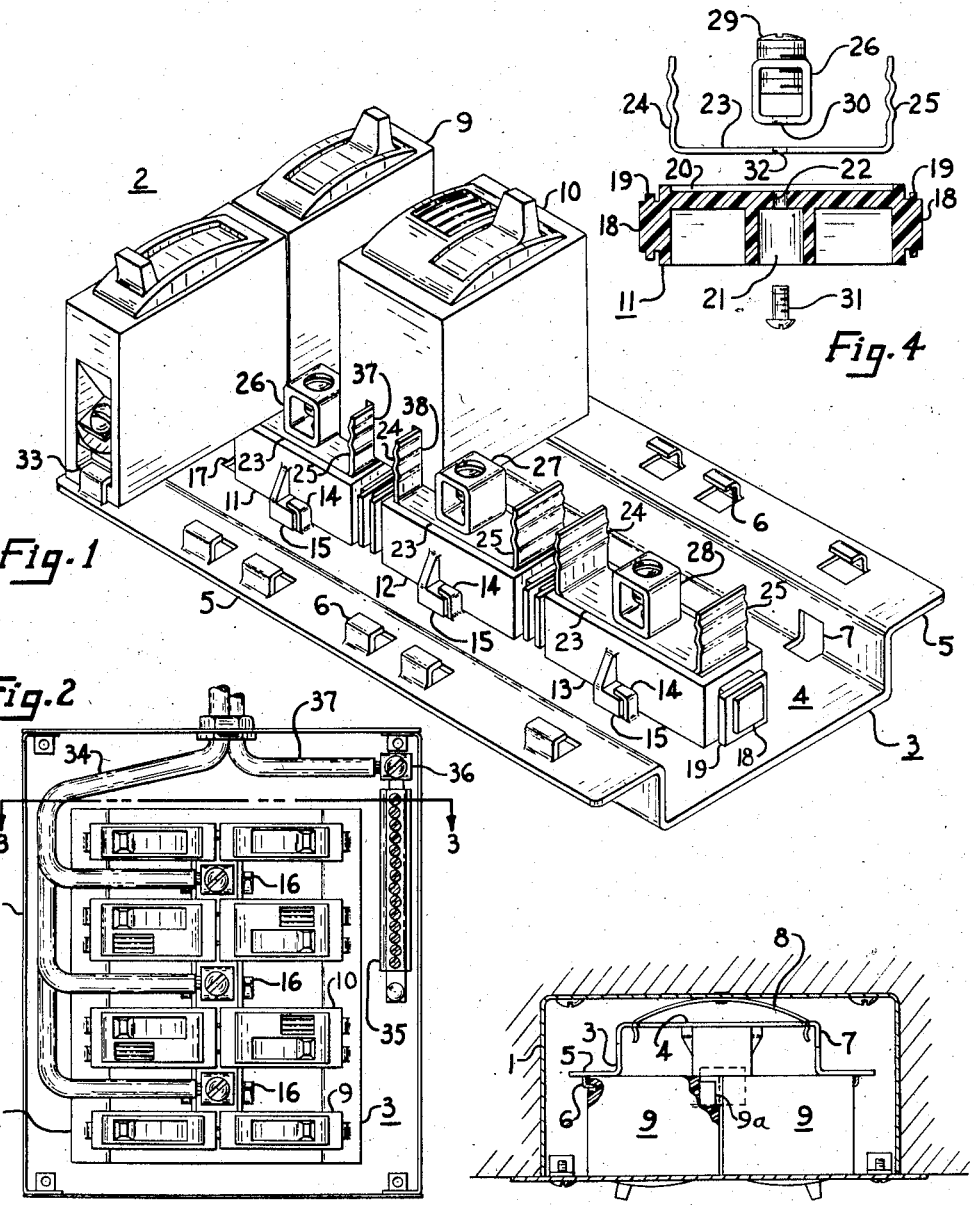
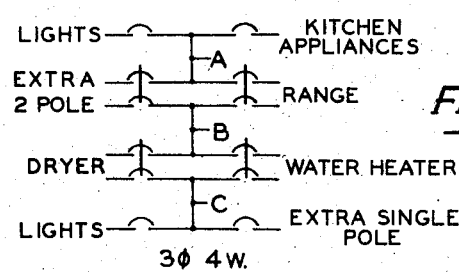

INVENTOR.
HERMAN J. HAMMERLY
BY Martin Kalikow
HIS ATTORNEY

United States Patent Office 2,897,410
Patented July 28, 1959

2,897,410

PLUG-IN TYPE CIRCUIT BREAKER PANELBOARD

Herman J. Hammerly, Plainville, Conn., assignor to General Electric Company, a corporation of New York Application March 7, 1955, Serial No. 492,405

9 Claims. (Cl. 317—119)

My invention relates to electric circuit breaker panelboards or load centers and especially to panelboards or load centers of the type utilizing circuit breakers which mount and make electrical connection by a plug-in type engagement such, for instance, as shown in Patent Number 2,738,446, issued March 13, 1956, to William J. Fleming, and assigned to the same assignee as the present invention; and in Patent Number 2,738,445, issued March 13, 1956, to Herman J. Hammerly et al., and assigned to the same assignee as the present invention.

The above patents disclose a circuit breaker panelboard of the plug-in type including a channel-shaped supporting pan having three elongated strap-type bus bars extending in edgewise alignment thereon, and a generally central row of upstanding circuit breaker contact blades each of the contact blades being connected to one of said bus bars by a branch connecting strap. The bus bars are provided at one or both ends thereof with terminal means for making connection to an incoming wire or cable. The patents also disclose insulating and supporting means for such a bus bar assembly including a resilient plastic body in which portions of the bus bar assembly are embedded. Circuit breakers having specially adapted mounting and connection means for use in such panelboards are also disclosed. Panelboards of the type set forth in the aforementioned patents have found wide acceptance in the electrical industry in recent years, particularly for use in homes and industrial buildings for the control of lighting and power branch circuits.

It is an object of my invention to provide an improved plug-in type circuit breaker panelboard of the type shown in the above-mentioned patents, which is less expensive to manufacture and easier to assemble.

Another object of my invention is to provide a plug-in type circuit breaker panelboard of this type requiring substantially less copper and insulating material than heretofore required.

A further object of my invention is to provide a circuit breaker panelboard of this type which is flexible and capable of many different adaptations.

It is a further specific object of my invention to provide a circuit breaker panelboard of the plug-in type comprising a basic unit or module which may be utilized singly or in multiple assemblies to provide a panelboard of desired capacity.

In accordance with my invention in one form I provide a plug-in circuit breaker panelboard comprising a basic panelboard unit including a support, a base of insulating material, a wide thin flat strip of conductive material mounted on the insulating base, having a central terminal portion and opposite bent-up end portions providing circuit breaker contact-blades, and wire connecting terminal means carried by the said central portion in alignment between said contact blades.

In accordance with further aspects of my invention two or three of such basic panelboard units are combined with their contact blade portions in alignment and with adjacent contact blade portions spaced apart a distance equal to the width of one circuit breaker whereby the said adjacent contact blade portion may be used to energize either two single-pole circuit breakers or one two-pole circuit breaker of a width equal to twice that of a single-pole breaker.

My invention will be more readily understood from the following description taken in connection with the accompanying drawing and its scope will be pointed out in the appended claims.

Figure 1 is a view in perspective of a panelboard interior assembly made in accordance with my invention.

Figure 2 is an elevation view of a complete panelboard made in accordance with my invention and shown as it appears when installed, the front cover of the enclosing box being removed.

Figure 3 is a view taken on the line 3—3 of Figure 2, the wiring and neutral terminal bar being omitted for clarity.

Figure 4 is a view of some of the parts of the panelboard of Figure 1, the parts being shown in exploded relation and partly in section.

Figure 5 is a schematic representation of the electrical connections of my panelboard as utilized in a typical three-phase four-wire electrical system.

Figure 6:
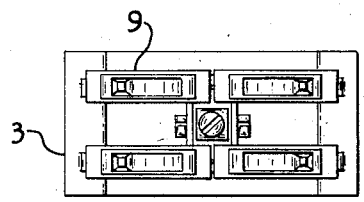
Figure 6 is a front elevation view of a four-circuit panelboard interior assembly in accordance with my invention and Figure 6a is a schematic representation of typical electrical connections for the panelboard of Figure 6.

Referring to the drawings I have shown my invention as embodied in a panelboard comprising a generally rectangular outer enclosure 1 having an interior assembly 2 therein for supporting and energizing circuit breakers. The panelboard interior assembly 2 comprises a generally channel-shaped supporting pan 3 having a back wall 4 and outwardly extending side flanges 5 provided with hook-like retaining elements 6. The support 3 is also provided with two pairs of opposed apertures 7 adapted to receive the return-bent end portions of resilient supporting strips 8 (only one strip shown). Certain features of the construction shown, especially as relating to the supporting strip 8, are disclosed in Patent 2,876,394 issued March 3, 1959 to C. B. Gerrish and assigned to the same assignee as the present invention. The support 3 has four single-pole circuit breakers 9 and four double-pole circuit breakers 10 mounted thereon, the outer end of each of the circuit breakers being supported on the flanges 5 and releasably held thereon by retaining elements 6. The circuit breakers 9 and 10 are each provided, within their casings and at a corner thereof opposite from said first supported ends, with contact blade receiving sockets 9a of the type disclosed in the abovementioned applications Serial Numbers 274,749 and 273,473, access to the sockets being had through slots or openings such as 37 and 38.

For the purpose of supporting and electrically connecting the circuit breakers 9 and 10, I provide an assembly comprising a plurality of discrete insulating supporting bases 11, 12 and 13 which are retained in position on the support 3 by means of lugs 14 which overlie integral lugs 15 on the insulating bases. It will be understood that while I have shown the supporting bases 11, 12 and 13 as discrete units in the preferred construction, I may alternatively form them as integral parts of one large base. Similar retaining lugs 16 are provided on the opposite side of the insulating bases, whereby substantially all movement of said insulating bases is prevented except longitudinally in an upward direction. For the purpose of preventing movement in the said upward direction, thereby locking the insulating bases in place on the support 3, I provide a lug 17 integral with the back wall of the support 3. By this means the bases 11, 12 and 13 are fixedly mounted on the support 3 entirely by lugs struck up from the back wall of the enclosure 1 and without the use of separate fastening elements.

Each of the supporting blocks 11, 12 and 13 comprises a generally rectangular elongated block of insulating material having projecting end spacer portions 18 provided with peripheral flanges 19. Each of the bases 11, 12 and 13 also has a shallow recess 20 in its upper surface, an enlarged generally central recess 21 in its back surface and a generally central aperture 22 joining said front and rear recesses. A circuit breaker connecting terminal strip 23 is positioned in the upper recess of each base and comprises an elongated strip of conductive material having a central portion and opposed end portions bent upwardly therefrom at right angles to provide circuit breaker contact blade portions 24 and 25, preferably corrugated as shown.

With the corrugated design shown, it has been found that a contact blade may be made of a material much thinner, for example, one-half as thick as with a straight flat blade, with no increase in temperature rise. It is believed that this is due to (1) higher concentration of contact force on discrete areas of the blade, and (2) ventilation permitted by the corrugations.

Each of the supporting bases 11, 12 and 13 is provided further with wire or cable connecting terminals 26, 27 and 28, respectively, of the pressure or "solderless" type, each having a clamping screw 29 threadedly engaged in the top wall thereof and a threaded aperture 30 in the bottom wall thereof. The connecting strip 23 and the connector 26 are adapted to be fixedly mounted on the insulating supporting base 11 by means of a bolt 31 which has its head portion located in the enlarged recess 21 and its shank portion passing through the aperture 22 in the block 11, thence through the opening 32 in the terminal portion of the strip 23, and into threaded engagement in the threaded aperture 30 of the connector 26. Insulating material (not shown) may also be added in the recess 21 over the head of the screw 31 if desired. By this construction, the rectangular sleeve 26 serves not only as a connecting device for mechanically and electrically connecting a wire or cable to the strip 23, but also serves as the retaining element for holding the strip 23 to the base 11.

The spacing of the circuit breaker contacting portions 24 and 25 from the adjacent sides of the connector 26 is preferably made slightly greater than one-half the width of the single-pole circuit breaker 9. The length of the end spacer portions 18 is also preferably made approximately equal to one-half the width of a single-pole circuit breaker 9. Thus when two mounting bases 11 and 12 are placed in end-to-end abutting relation, the corresponding adjacent contact blades 24, 25 are automatically spaced apart a distance approximately equal to the width of a single-pole circuit breaker 9.

As disclosed in the above-mentioned patents, each of the circuit breakers 9 and 10 has a recessed portion providing a shelf 33 which is adapted to be received under one of the retaining elements 6. The circuit breaker is mounted by first engaging the shelf 33 under the hook 6 and thereafter rotating it about the lug 6 until the socket at the opposite end enters into frictionally retained engagement with one of the contact blades 24, 25 each of the contact blades 24 and 25 being adapted to make connection with two single-pole circuit breakers.

It will be observed that when all the circuit breakers are in place as indicated in Figure 2 space is afforded between the adjacent side walls of the circuit breakers connected to a given strip 23 which space permits the introduction of a conductor or cable 34 for insertion in and connection to the connectors 26, 27 and 28.

The panelboard of Figure 2 is shown as provided with a terminal board 35 comprising a conductive strip having a number of screws therein and having a main conductor 36 for connection to a main power return or neutral conductor 37. A typical schematic arrangement of a twelve-circuit panelboard incorporating my invention is indicated in Figure 5. It will be noted that provision is made by my panelboard for accommodation of up to four two-pole circuit breakers. A two-pole circuit breaker is ordinarily used simultaneously to switch or control two power feed lines of different electrical potential. For this reason, each two-pole circuit breaker must make contact with two adjacent contact blades which are of different electrical potential or phase. Such two-pole breakers, such as circuit breaker 10, moreover, are ordinarily made with contact receiving apertures 37, 38 spaced apart a distance equal to the width of the double-pole circuit breaker 10, so that they may be used in a panelboard having standard single-pole spacing of contact blades. Because of the arrangement of the bases 11, 12 and 13, and the provision of end spacer portions 18 in my improved panelboard it is possible for the user to insert one two-pole circuit breaker such as 10, or two single-pole circuit breakers such as 9 at locations adjacent the abutting ends of individual mounting bases.

Figure 7:
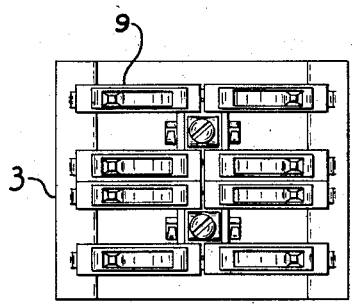
Figure 7 is a front elevation view of an eight-circuit panelboard interior assembly in accordance with my invention and Figure 7a is a schematic representation of typical electrical connections of the panelboard of Figure 7.
Figure 8:
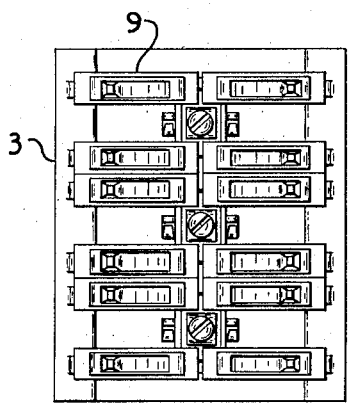
Figure 8 is a front elevation view of the twelve-circuit panelboard interior assembly in accordance with my invention and Figure 8a is a schematic representation of typical electrical connections of the panelboard of Figure 8.
Figure 8A:
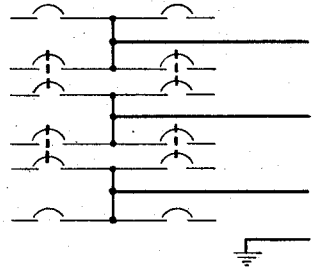

In Figures 6, 7 and 8, I have illustrated three panelboards made in accordance with my invention and utilizing one, two and three basic interior assembly units respectively.

Figure 6A:
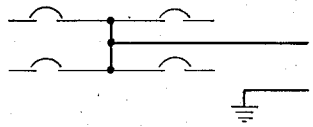

Figure 6 illustrates a four-circuit panelboard, while Figure 6a is the corresponding electrical diagram. As shown, this panelboard provides mounting and energizing means for four single-pole circuit breakers. This capacity panelboard is used for simple installations using only one power feed-in conductor.

Figure 7A:
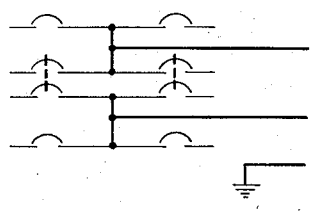

Figure 7 illustrates an eight-circuit panelboard, and Figure 7a the corresponding electrical diagram. This panelboard can accommodate eight single-pole circuit breakers, or it can accommodate six single-pole breakers and one two-pole breaker, or four single-pole breakers and two two-pole breakers.

This type of panelboard is suitable for installations having two power feed-in conductors of differing voltage and requiring at least one two-pole breaker the connection ordinarily being referred to as a single-phase three-wire system.

Figure 8 illustrates a twelve-circuit panelboard and 8a the corresponding electrical diagram. The panelboard can accommodate twelve single-pole breakers or from one to four two-pole breakers with the balance made up of single-pole breakers.

This type of panelboard is suitable for installations having three power feed-in conductors of differing voltage or phase and requiring from one to four two-pole breakers, ordinarily referred to as three-phase four-wire systems.

By means of my invention, the amount of copper required for a twelve-circuit three-phase four-wire panelboard is reduced from 16 ounces to 4 ounces, or seventy-five percent; the amount of insulating material required is reduced from 14 ounces to 2 ounces, or eighty-six percent; and the over-all cost of the panelboard has been reduced to less than half the cost of the prior design.

While I have shown a particular embodiment of my invention, it will be understood that I do not wish to be limited thereto since many modifications thereof may be made. I, therefore, contemplate by the appended claims to cover all such modifications as fall within the true spirit and scope of my invention.

What I claim as new and desire to secure by Letters Patent of the United States is:

1. A circuit breaker panelboard comprising a support, an insulating mounting base on said support, circuit breaker connecting means on said mounting base comprising a relatively thin wide flat strip of conductive material having its opposite end portions bent up to provide contact-blade portions, wire connecting terminal means carried by the central portion of said strip between said contact blade portions for electrically connecting said strip to a source of electric power, and retaining means passing through said support and said conducting strip and engaging said wire connecting means for retaining said wire connecting means on said strip and said strip on said insulating base.

2. A circuit breaker panelboard comprising a support, a plurality of insulating mounting bases on said support, circuit breaker connecting means on each of said mounting bases comprising a relatively thin wide flat strip of conductive material having opposite end portions bent up to provide contact-blade portions for making plug-in connection with circuit breakers having a generally rectangular insulating casing of predetermined width, means carried by the central portion of said strip between said contact blade portions for electrically connecting said strip to a source of electric power, said mounting bases having spacer portions projecting at opposite ends thereof and adapted to abut against the end portions of adjacent mounting bases, said spacer portions extending beyond said blade portions a distance substantially equal to one-half the width of said circuit breaker casings.

3. A circuit breaker panelboard comprising a support, a plurality of insulating mounting bases on said support, circuit breaker connecting means on each of said mounting bases comprising a relatively thin wide flat strip of conductive material having opposite end portions bent up to provide contact-blade portions for making plug-in connection with circuit breakers having a generally rectangular insulating casing of predetermined width, means carried by the central portion of said strip between said contact blade portions for electrically connecting said strip to a source of electric power, said mounting bases having spacer portions projecting at opposite ends thereof and adapted to abut against the end portions of adjacent mounting bases, said spacer portions being so dimensioned that when two of said mounting bases are in end-to-end abutting relation, the adjacent blade portions of said bases are spaced apart a distance substantially equal to the width of said circuit breaker casing.

4. The circuit breaker panelboard as set forth in claim 2, the spacer portions of said mounting bases being provided with at least one peripheral flange spaced from the end of said spacer portion.

5. A circuit breaker panelboard comprising a support, a first pair of opposed retaining means on said support for releasably retaining a pair of circuit breakers thereon, a second pair of opposed retaining means on said support for releasably retaining a second pair of circuit breakers thereon, circuit breaker connecting means adapted to make plug-in electrical connection with all four of said releasably retained circuit breakers when in mounted position comprising a relatively thin wide strip of conductive material having a central portion mounted on said support in insulating relation thereto and opposite end portions extending at right angles to said central portion to provide upstanding contact blade portions, each of said contact blade portions extending between and in edgewise alignment with a pair of said opposed releasable breaker-retaining means and wire connecting terminal means carried by said central portion of said strip between said contact blade portions for electrically connecting said strip to a source of electric power.

6. A circuit breaker panelboard comprising a support, a first pair of opposed retaining means on said support for releasably retaining a pair of circuit breakers thereon, a second pair of opposed retaining means on said support for releasably retaining a second pair of circuit breakers thereon, a mounting base on said support between said pairs of opposed retaining means, said base comprising a generally rectangular block of insulating material having a generally central aperture therein, a recess at the back of said block communicating with said aperture, mounting means located outside of said aperture for releasably retaining said mounting base on said support, circuit breaker connecting means adapted to make plug-in electrical connection with all four of said releasably retained circuit breakers when in mounted position comprising a relatively thin wide strip of conductive material having a central portion on said insulating mounting base and having an aperture coinciding with said central aperture on said base and opposite end portions extending at right angles to said central portion to provide upstanding circuit breaker contact blade portions, each of said circuit breaker contact blade portions extending between and in edgewise alignment with a pair of said opposed releasably breaker-retaining means and a wire connecting terminal comprising a generally rectangular tubular clamping member of conductive material having a threaded aperture in the bottom wall thereof and fastening means comprising a bolt having its head located in said enlarged recess and its shank passing through said apertures in said insulating base and said conductive strip and having its end threadedly engaged in said threaded aperture of said wire connecting terminal, said upstanding circuit breaker connecting portions being spaced from the adjacent sides of said tubular clamping member a distance at least as great as one-half the width of said circuit breakers, whereby the adjacent side walls of said circuit breakers when inserted are spaced apart to afford passage for a conductor to be inserted in said connector.

7. A circuit breaker panelboard comprising a support, a first pair of circuit breakers mounted on said support in end-to-end substantially abutting relation, a second pair of circuit breakers mounted on said support in end-to-end substantially abutting relation, said first and second pairs of circuit breakers extending in generally parallel side-by-side relation, the adjacent sides of said circuit breakers being spaced apart from each other a substantial amount, opposed retaining means on said support for releasably retaining the outer ends of said pairs of circuit breakers, a generally rectangular block of insulating material on said support substantially midway between said outer ends of said circuit breakers, a relatively thin wide strip of conductive material having a central portion mounted on said insulating block and opposite end portions extending at right angles to said central portion each of said upstanding end portions of said strip extending into frictionally retained engagement with the connecting sockets of a pair of said circuit breakers and wire connecting means carried by said central portion of said strip and having a wire-receiving aperture therein directed toward the said space between the adjacent side of said pairs of circuit breakers whereby to make electrical connection with an electric wire conductor extending between said adjacent side of said circuit breakers.

8. A circuit breaker panelboard comprising a pair of relatively thin straight strips of conductive material each having a central terminal portion and opposed circuit breaker contact blade portions extending at right angles to said central portion and wire connecting terminal means carried by said central portion in alignment between said circuit breaker contact blade portions, said connecting strips extending in lengthwise alignment with each other with adjacent circuit breaker contact blade portions extending in generally parallel spaced-apart relation, the distance between each circuit breaker contact blade portion and the nearest portion of said wire connecting terminal means of each connecting strip being substantially equal to one-half the spacing between said adjacent circuit breaker contact blade portions.

9. A circuit breaker panelboard comprising three relatively thin straight strips of conductive material having a central terminal portion and opposed circuit breaker contact blade portions extending at right angles to said central portion and wire connecting terminal means carried by said central portion in alignment between said circuit breaker contact blade portions, said connecting strips extending in lengthwise alignment with each other with adjacent circuit breaker contact blade portions extending in generally parallel substantially spaced-apart relation, the distance between each circuit breaker contact blade portion and the nearest portion of said wire connecting terminal means of each connecting strip being substantially equal to one-half the spacing between said adjacent circuit breaker contact blade portions.

References Cited in the file of this patent

UNITED STATES PATENTS

| | | |
|---|---|---|
| 2,647,225 | Cole et al. | July 28, 1953 |
| 2,707,761 | Page | May 3, 1955 |
| 2,737,613 | Morris | Mar. 6, 1956 |
| 2,738,446 | Fleming | Mar. 13, 1956 |